Patented Aug. 16, 1932

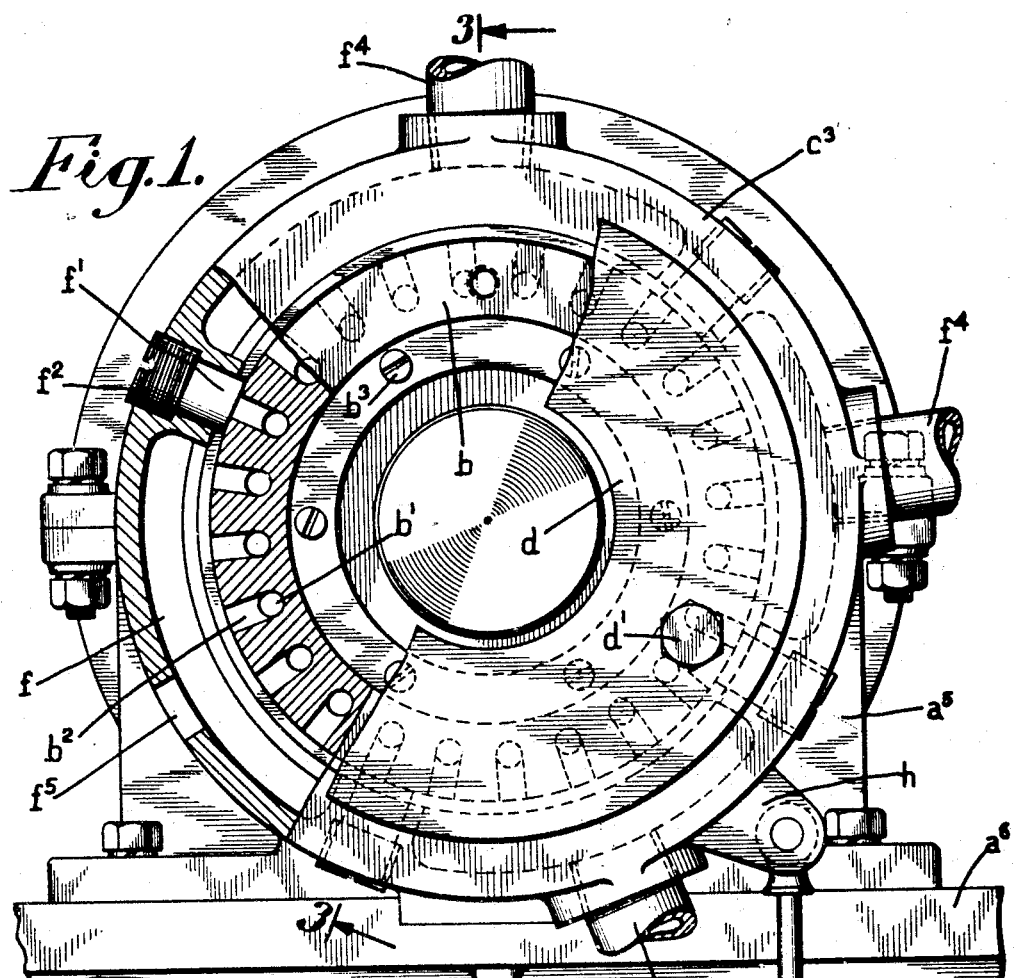
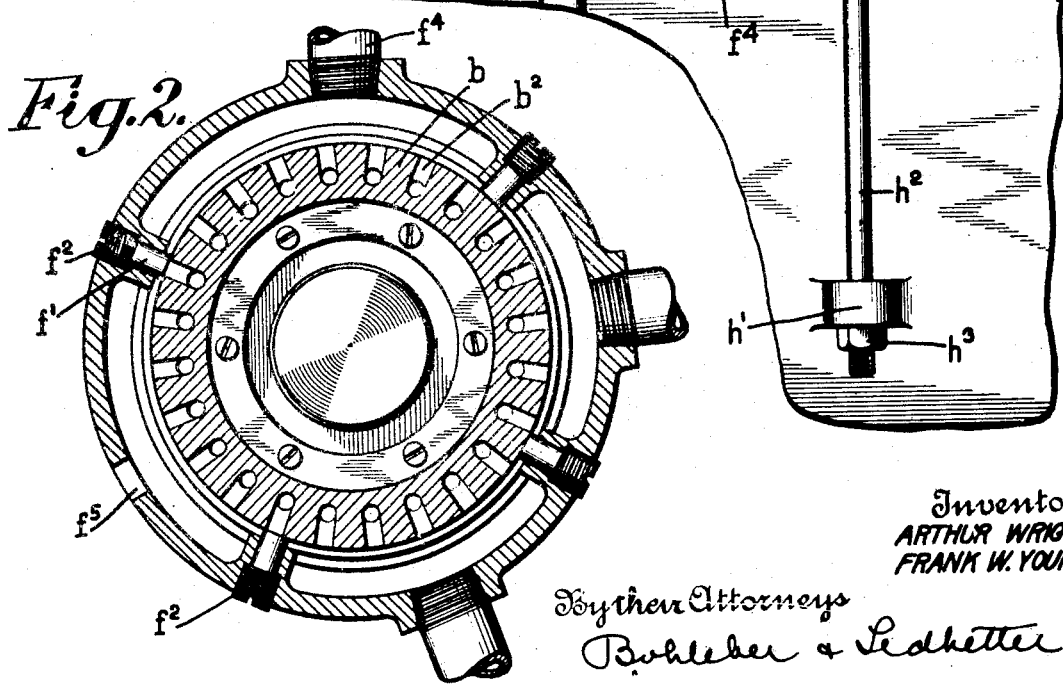

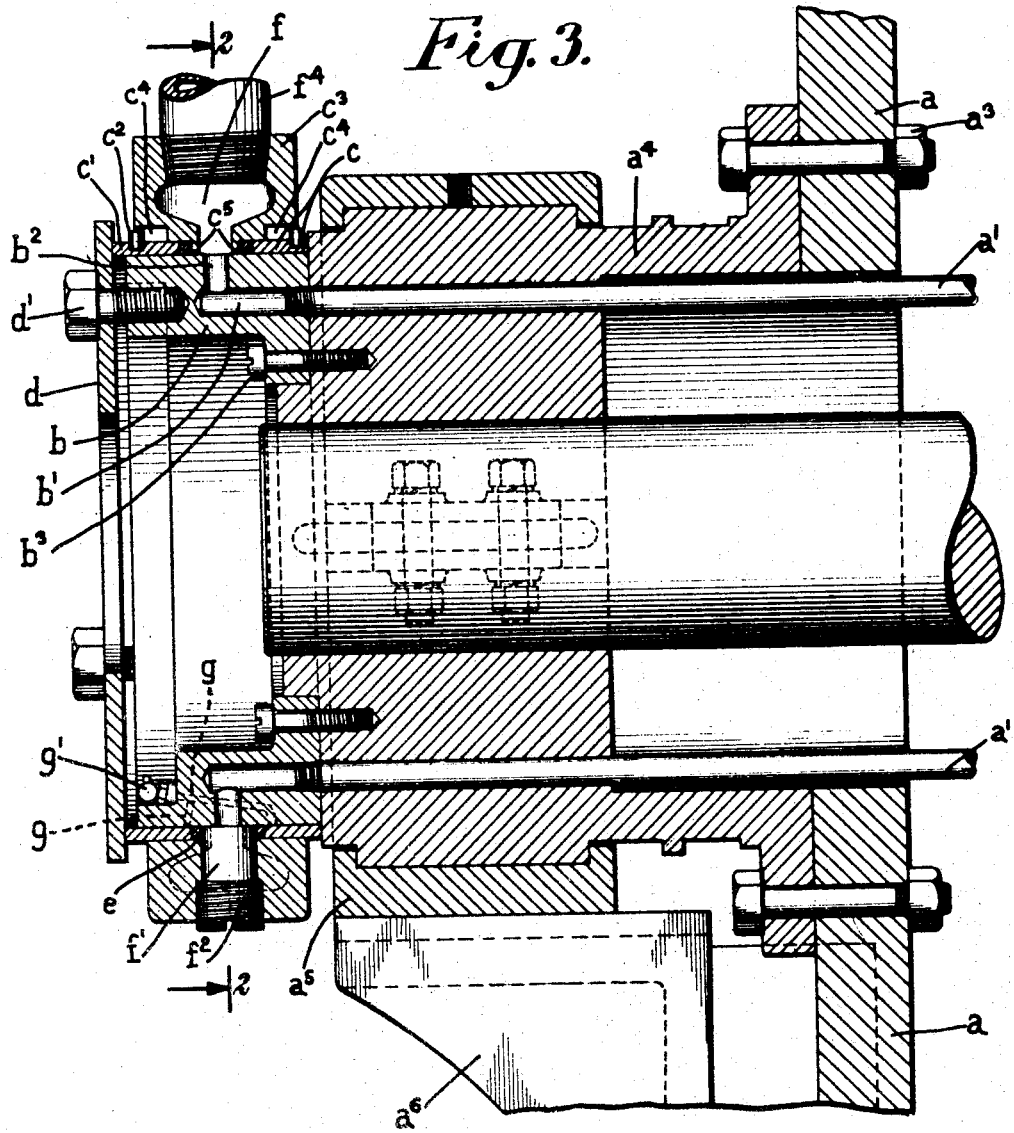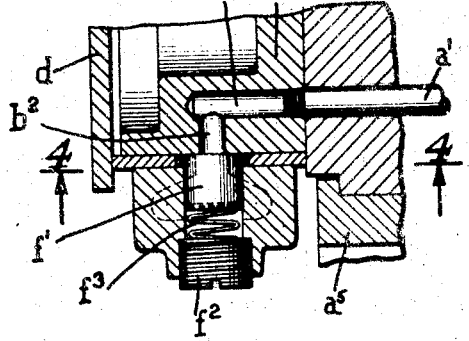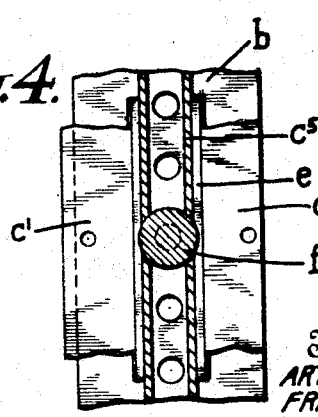

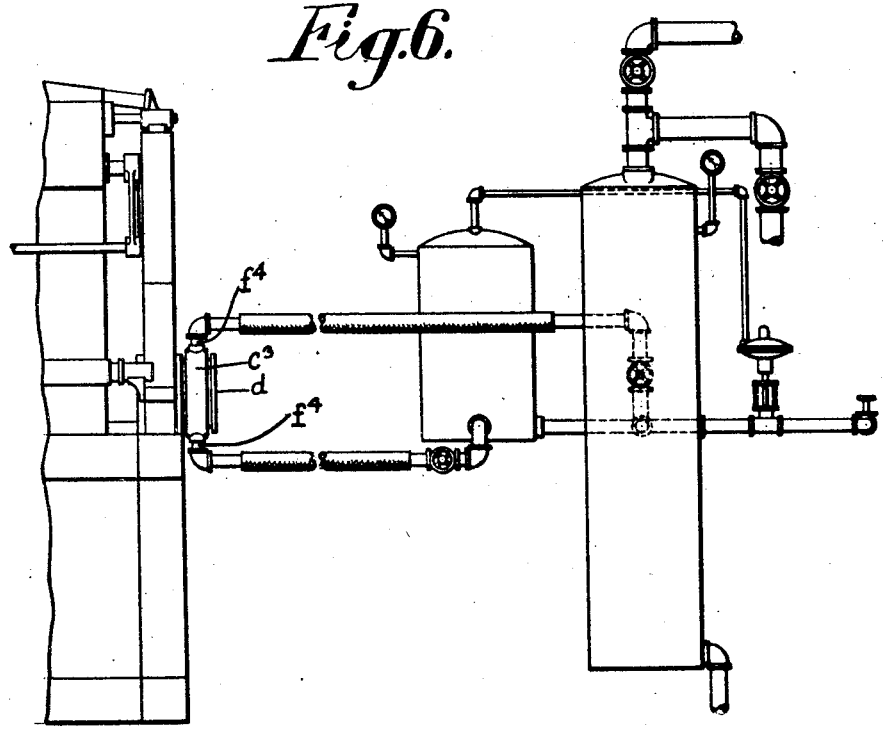
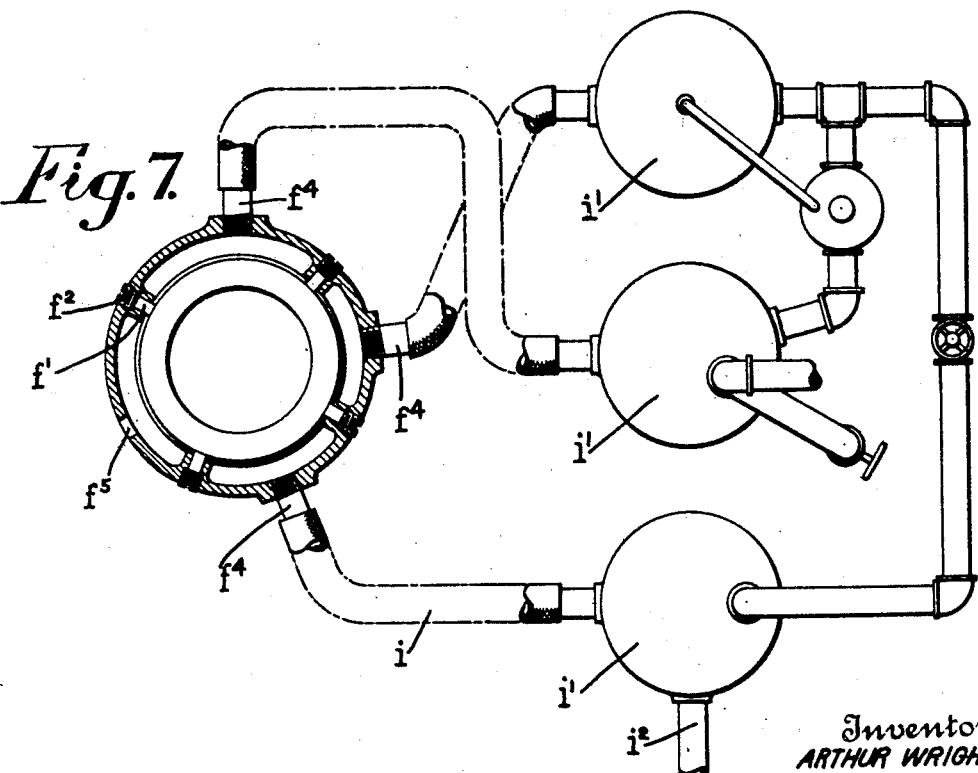

1,872,209

UNITED STATES PATENT OFFICE

ARTHUR WRIGHT, OF UPPER MONTCLAIR, AND FRANK W. YOUNG, OF VERONA, NEW JERSEY

VALVE FOR FILTERING DEVICES

Application filed December 24, 1927. Serial No. 242,499.

The present invention relates to devices for filtering, in which the filtering element is mounted to rotate and is partially submerged in a slurry tank. A common form of such device includes a cylinder mounted in suitable trunnion bearing and carrying a filter cloth on its circumferential surface. Under the filter cloth suitable ducts are provided which communicate with pipes to carry the filtrate to a bearing where a valve connects the pipes with proper outlet pipes.

It is frequently desirable to keep the filtrate from one portion of the cycle of rotation of the drum, separate from that of another and a special collector valve is required to connect the proper outlet pipe with the filtrate pipes on the rotating drum during the proper period in the rotation of the latter. Heretofore these valves have been constructed to abut against the hollow trunnion carrying the filtrate pipes and exert an axial thrust thereagainst to provide the required seal. Not only has this form of valve caused great friction between the relatively movable parts but it has been difficult to maintain the correct presure continuously and provide for the thrust due to the seating of the valve disc.

The present invention provides a new type of valve for collecting the filtrate from different fi.' ering zones, wherein all axial thrust upon the rotating element is eliminated.

An object of this invention is to provide a valve of the above character which reduces the friction between rotating parts to a minimum and yet maintains an absolutely tight joint, not only between the relatively movable elements, but also between the sectors of the valve collecting filtrate from different filtering zones.

A further object of the invention is to provide a structure which relieves the sealing elements from the weight of the valve structure and insures a maximum life of these important parts while requiring very little attention.

The invention further consists in providing a simple and effective means for taking upon the parts to compensate for wear, as well as for adjusting the valve with respect to the filtering zones.

Further objects will appear as the description proceeds and reference will now be had to the accompanying drawings, wherein:

Figure 1 is an end elevation, partly broken away and in section, showing a preferred form of the valve constructed in accordance with the present invention.

Figure 2 is a view in section taken on lines 2—2 of Figure 3 and looking in the direction of the arrows.

Figure 3 is a view in section, taken on line 3—3 of Figure 1 and looking in the direction of the arrows.

Figure 4 is a detail view showing the relation of the ports to the division plugs, packing and lubricating rings, the view being taken on line 4—4 of Figure 5.

Figure 5 is a detail view showing the relation of the parts in Figure 3, from a different angle.

Figure 6 is a view in elevation showing a filtering device assembled and provided with the improved form of valve.

Figure 7 is a view illustrating the manner in which the valve is connected to the associated outlet mechanism.

Referring particularly to Figures 1 and 3, $a$ indicates the end plate of a filter drum carrying the filtrate pipes $a'$ which are the outlet pipes from the compartments beneath the fitering medium on the filter drum periphery. Bolts $a^3$ secure a hollow trunnion $a^4$ to the end plate, the filtrate pipes $a'$ extending through the end of the trunnion and terminating in a valve core $b$. Suitable conduits $b'$ formed in the valve core $b$ connect the pipes ($a'$) with the appropriate ports $b^2$ in the valve core $b$, one port for each conduit and pipe and bolts $b^3$ secure the core $b$ to the end of the trunnion $a^4$. The trunnion $a^4$ is carried in a bearing $a^5$ formed on a bracket $a^6$. The specific means for mounting the trunnion forms no part of the present invention and further description thereof is unnecessary.

Inner and outer packing rings $c$ and $c'$, respectively, carry positioning pins $c^2$. the pins $c^2$ are engaged by slots $c^4$ in the stationary collector ring $c^3$ to hold the packing rings $c, c'$ stationary with the collector ring $c^3$.

Pressure upon the packing rings is varied by means of a clamping ring $d$, clamped against the rings by means of bolts $d'$. Packing $e$ is provided between the packing rings $c$, $c'$ and the collector rings $c^3$, the latter being provided with radially extending flanges $c^5$ which serve, with the packing rings $c$, $c'$, to hold and/or compress the packing to seal the joint and prevent the entrance or leakage of air into the valve ring sectors or compartments $f$. The packing rings serve to support the valve ring from the valve core and are designed to prevent the flanges $c^5$ from contacting with the valve core and wearing grooves therein, although the clearance therebetween is very slight.

It is frequently desirable to separate the filtrate from the first zone from other zones because it carries particles which may be filtered out in subsequent steps. This cloudy liquor is then returned to the slurry tank and refiltered. In addition to this operation, it may be desirable to wash the precipitate several times and separate the liquid from the respective washes. The final zone or operation usually consists of introducing atmospheric pressure to the underside of the filter cloth to permit the precipitate to be removed. All of these steps require that the filtrate from the respective zones be kept separate and in the present embodiment there are four zones viz.; main filtering zone, two washing zones and an atmospheric zone.

The collector ring, to accommodate the above four steps, is provided with four sectors or compartments $f$ separated by division plugs $f'$. There plugs may be of lignum vitae or other suitable substance preferably non-metallic, and are seated by set screws $f^2$ which may vary the pressure upon springs $f^3$ (see Figure 5). Outlet pipes $f^4$ are provided for carrying off the filtrate while an aperture $f^5$ introduces atmospheric pressure to the under portion of the filter cloth at the point, say, of filter cake discharge.

To reduce the friction between the relatively movable parts to a minimum, lubricating ducts $g$ may be formed in the valve core $b$. A fitting $g'$ supplies lubricant to the surface between the moving parts.

Particular attention is given the seal about the division plugs. These plugs are wider than the the distance from outer face to outer face of the flanges $c^5$ and the latter are cut away to receive the plugs snugly. This is shown in Figure 4 in which it will be observed that the plug extends beyond the flanges $c^5$ and into the packing $e$. This structure provides a tight joint and eliminates all leakage. It also helps to prevent the packing $e$ from turning.

In order that the collector ring may be adjusted to vary its relation to the filtering zones an ear $h$ is formed on the external surface of the collector ring, and an ear $h'$ is formed on the bracket $a^6$. Adjusting rod $h^2$ is pivotally secured to the ear $h$ and adjustable with respect to the ear $h'$. By adjusting nut $h^3$ the position of the collector ring with respect to the filtering zones may be varied.

In Figures 6 and 7 the manner of connecting the outlet pipes to suitable vacuum or pressure sources is illustrated. Outlet pipes $f^4$ are connected to conduits $i$ which communicate with pressure or vacuum tanks $i'$. The filtrate is withdrawn from these tanks at $i^2$ by suitable filtrate pumps.

From the above description it will be apparent that a valve has been provided having capacity for collecting the filtrate from a plurality of filtering zones and effectively withdrawing such filtrate in separate pipes. The life of the valve is increased indefinitely by carrying it upon the packing rings and/or the division plugs and the packing and sealing structure is relieved from all duty save that of rendering the various sectors and parts fluid tight. Should there occur any tendency to leak, the vacuum in the collector ring sectors tightens the seal automatically by drawing the packing inwardly against the flanges and related parts.

No limitation is to be imposed upon the scope of this invention by reason of the foregoing detailed description, it being defined in the appended claims.

We claim as our invention:

1. A collecting valve comprising a valve core, ports disposed therein radially, collecting means carried with the core, and spaced non-metallic means to support the collecting means from the core.

2. A collecting valve comprising a valve core, ports disposed therein radially, an annular collector ring carried with the core, spaced non-metallic means to support the collector ring from the core, and means to provide a fluid tight joint between the ring and the core.

3. A collecting valve comprising a valve core, ports disposed therein radially, an annular collector ring carried with the core, spaced non-metallic means to support the ring upon the core, and packing between the ring and core.

4. A collecting valve comprising a valve core, ports disposed therein radially, an annular collector ring carried with the core, means to support the ring upon the core, packing between the ring and core, and means to cause the supporting means to exert a force against the packing.

5. A collecting valve comprising a valve core member, ports disposed therein radially, an annular collector ring member carried with the core and spaced therefrom means to support the ring upon and spaced from the core, radial flanges upon one of the members extending towards the other member and between which fluid is withdrawn, packing between the spaced ring and core, and means to cause the supporting means to confine the packing between the ring and core and against the flanges.

6. A collector valve comprising a valve core, ports disposed therein radially, an annular collector ring carried by the core, a packing ring between the core and collector ring non-metallic means supporting the collector ring upon the core, and means to introduce lubricant between the core and packing ring.

7. A collector valve comprising a valve core, ports disposed therein radially, an annular collector ring carried by the core, a packing ring between the core and collector ring, inwardly extending radial flanges upon the collector ring between which fluid is withdrawn, packing between the core and collector ring, and means to cause the packing ring to confine the packing between the core and collector ring and against the flanges.

8. A collector valve comprising a valve core, ports disposed therein radially, an annular collector ring carried by the core, a packing ring between the core and collector ring, inwardly extending radial flanges upon the collector ring between which fluid is withdrawn, annular packing elements between the core and collector ring and lying against the flanges, and means to cause the packing ring to seat the packing under an adjustable pressure.

9. A collector valve comprising a valve core, ports disposed therein radially, an annular collector ring carried by the core, spaced packing rings between the core and collector ring, and means to introduce lubricant between the core and packing rings.

10. A collecting valve comprising a valve core, ports disposed therein radially, an annular collector ring carried by the core, spaced packing rings between the core and collector ring, inwardly extending radial flanges upon the collector ring between which fluid is withdrawn, said flanges lying between the packing rings, annular packing elements between the flanges and the respective packing rings, and means to force the packing rings against the packing.

11. A collecting valve comprising a valve core, ports disposed therein radially, an annular collector ring carried by the core, spaced packing rings between the core and collector ring, inwardly extending radial flanges upon the collector ring between which fluid is withdrawn, said flanges lying between the packing rings and being of smaller depth than the packing rings, said flanges being maintained out of engagement with the valve core, annular packing elements between the flanges and the respective packing rings, and means to force the packing rings against the packing.

12. A collecting valve comprising a valve core, ports disposed therein radially, an annular collector ring carried with the core, means to provide a fluid tight joint between the ring and the core, and non-metallic means to divide the collector ring into annular sectors for collecting fluid from a plurality of porting zones of the core.

13. A collecting valve comprising a valve core, ports disposed therein radially, an annular collector ring carried with the core, means to provide a fluid tight joint between the ring and the core, and radially extending non-metallic means to divide the collector ring into annular sectors for collecting fluid from a plurality of porting zones of the core.

14. A collecting valve comprising a valve core, ports disposed therein radially, an annular collector ring carried with the core, means to provide a fluid tight joint between the ring and the core, and radially extending and rotatably adjustable non-metallic division plugs to divide the collector ring into annular sectors for collecting fluid from a plurality of porting zones of the core.

15. A collecting valve comprising a valve core, ports disposed therein radially, an annular collector ring carried with the core, means to provide a fluid tight joint between the ring and the core, radially extending division plugs in the collector ring to divide the latter into annular sectors for collecting fluid from a plurality of porting zones of the core, and means to adjust the plugs radially.

16. A collecting valve comprising a valve core, ports disposed therein radially, an annular collector ring carried with the core, inwardly extending radial flanges on the collector ring, packing rings on either side of the flanges, radially extending division plugs in the collector ring to divide the latter into annular sectors for collecting fluid from a plurality of porting zones of the core, and means to adjust the plugs radially.

17. A collecting valve comprising a valve core, ports disposed therein radially, an annular collector ring carried with the core, inwardly extending radial flanges on the collector ring, packing rings on either side of the flanges, radially extending division plugs in the collector ring to divide the latter into annular sectors for collecting fluid from a plurality of porting zones of the core, annular packing sections between the flanges and the packing rings, and means to adjust the plugs radially.

18. A collecting valve comprising a valve core, ports disposed therein radially, an annular collector ring carried with the core, inwardly extending radial flanges on the collector ring, packing rings on either side of the flanges, radially extending division plugs in the collector ring to divide the latter into annular sectors for collecting fluid from a plurality of porting zones of the core, said plugs being wider than the spaced flanges and extending through the latter, and annular packing sections between the flanges and the packing rings and engaging the portion of the plugs extending through the flanges.

19. A collecting valve comprising a valve core, ports disposed therein radially, an annular collector ring carried with the core, means to provide a fluid tight joint between the ring and the core, spaced non-metallic means to divide the collector ring into annular sectors for collecting fluid from a plurality of porting zones of the core, and means to adjust the collector ring angularly with respect to the valve core.

20. A collecting valve, comprising a rotary cored member, delivery ports disposed radially therein, said member being disposed rotatably within a cored annular collector ring, spaced non-metallic radial members disposed in the said collector ring supporting the said ring on the rotary cored member and dividing the core of the collecting ring into separate chambers, and the said cored ring being rotatably adjustable upon the rotary cored member.

21. A collecting valve comprising a valve core formed with ports, collecting means carried with the core and non-metallic means supporting the collecting means from the core.

22. A collecting valve comprising a valve core formed with ports, an annular collecting means carried with the core and non-metallic means supporting the collecting means from the core.

23. A collecting valve comprising a valve core having ports formed in its periphery, an annular collecting ring within which the core is disposed, means to support the ring from the core, packing between the ring and core and means to cause the packing to yieldingly engage the supporting means.

24. A collecting valve comprising a valve core having ports formed in its periphery, an annular collecting ring within which the core is disposed, non-metallic means to support the ring from the core, packing between the ring and core and means to cause the packing to yieldingly engage the supporting means.

25. A collecting valve comprising a valve core formed with ports in its periphery, an annular collector ring carried by the core, spaced packing between the core and collector ring, spaced packing rings between the core and collector ring and engaging the packing and means preventing rotation of the packing ring with respect to the collector ring.

This specification signed this 20th day of December, A. D. 1927.

ARTHUR WRIGHT.
FRANK W. YOUNG.